US009662779B1

(12) United States Patent
Yancey

(10) Patent No.: US 9,662,779 B1
(45) Date of Patent: May 30, 2017

(54) ERGONOMIC COUNTER-BALANCED HANDLED TOOL

(71) Applicant: David Yancey, Burnet, TX (US)

(72) Inventor: David Yancey, Burnet, TX (US)

( * ) Notice: Subject to any disclaimer, the term of this patent is extended or adjusted under 35 U.S.C. 154(b) by 0 days.

(21) Appl. No.: 15/008,940

(22) Filed: Jan. 28, 2016

(51) Int. Cl.
*A01B 1/02* (2006.01)
*B25G 1/10* (2006.01)
*E01H 5/02* (2006.01)
*A47L 13/02* (2006.01)
*A01D 9/00* (2006.01)

(52) U.S. Cl.
CPC .............. *B25G 1/102* (2013.01); *A47L 13/02* (2013.01); *E01H 5/02* (2013.01); *A01B 1/022* (2013.01); *A01D 9/00* (2013.01)

(58) Field of Classification Search
CPC .................................. E02F 3/02; A01B 1/022
USPC ........ 294/49, 54.5, 57, 58, 153, 51, 178, 59; 15/144.1; 16/430
See application file for complete search history.

(56) References Cited

U.S. PATENT DOCUMENTS

| 933,647 | A | * | 9/1909 | Hunt | B25G 1/00 |
| | | | | | 294/58 |
| 1,083,054 | A | * | 12/1913 | Brown | B25G 1/00 |
| | | | | | 15/246 |
| 3,078,604 | A | * | 2/1963 | Neuman | E01H 5/02 |
| | | | | | 294/54.5 |
| 3,222,699 | A | * | 12/1965 | Zeisig | E01H 5/02 |
| | | | | | 294/51 |
| 3,964,182 | A | * | 6/1976 | Pomeret | E02F 3/02 |
| | | | | | 172/41 |
| 3,981,043 | A | * | 9/1976 | Curry | B25G 1/06 |
| | | | | | 15/154.2 |
| D275,928 | S | | 10/1984 | LoPresti | |
| 4,691,954 | A | | 9/1987 | Shaud | |
| 4,772,057 | A | | 9/1988 | Harvey | |
| 5,533,768 | A | | 7/1996 | Mitchell | |
| D381,875 | S | * | 8/1997 | Spear | D8/10 |
| 6,439,630 | B1 | | 8/2002 | Eatmon | |
| 8,177,272 | B2 | * | 5/2012 | Schinella, Jr. | E01H 5/02 |
| | | | | | 294/53.5 |
| 2007/0227048 | A1 | | 10/2007 | Adinata | |
| 2014/0259551 | A1 | * | 9/2014 | Egbert | A45F 3/14 |
| | | | | | 24/302 |
| 2014/0361059 | A1 | * | 12/2014 | Fuller, Sr. | A45F 5/00 |
| | | | | | 224/267 |

* cited by examiner

*Primary Examiner* — Paul T Chin

(57) ABSTRACT

An ergonomic counter-balanced handled tool that is ergonomic and counter-balanced includes a tube that is angled proximate to a midpoint of the tube defining a lower section and an upper section of the tube. The lower section extends transversely from the upper section. A counterweight is slidably coupled to the upper section proximate to a first end of the tube. The counterweight is positionable at a user-selected distance from the first end. A tool is reversibly couplable to a second end of the tube. A harness is couplable to the upper section of the tube, such that the harness is configured to position around a user's shoulder. The counterweight is positioned to extend from the first end of the tube such that the tool and a respective load positioned at the second end are substantially balanced relative to the harness.

19 Claims, 5 Drawing Sheets

ERGONOMIC COUNTER-BALANCED HANDLED TOOL

BACKGROUND OF THE DISCLOSURE

Field of the Disclosure

The disclosure relates to handled tools and more particularly pertains to a new handled tool that is ergonomic and counter-balanced.

SUMMARY OF THE DISCLOSURE

An embodiment of the disclosure meets the needs presented above by generally comprising a tube that is angled proximate to a midpoint of the tube defining a lower section and an upper section of the tube. The lower section extends transversely from the upper section. A counterweight is slidably coupled to the upper section proximate to a first end of the tube. The counterweight is positionable at a user-selected distance from the first end. A tool is reversibly couplable to a second end of the tube. A harness is couplable to the upper section of the tube, such that the harness is configured to position around a user's shoulder. The counterweight is positioned to extend from the first end of the tube such that the tool and a respective load positioned at the second end are substantially balanced relative to the harness.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
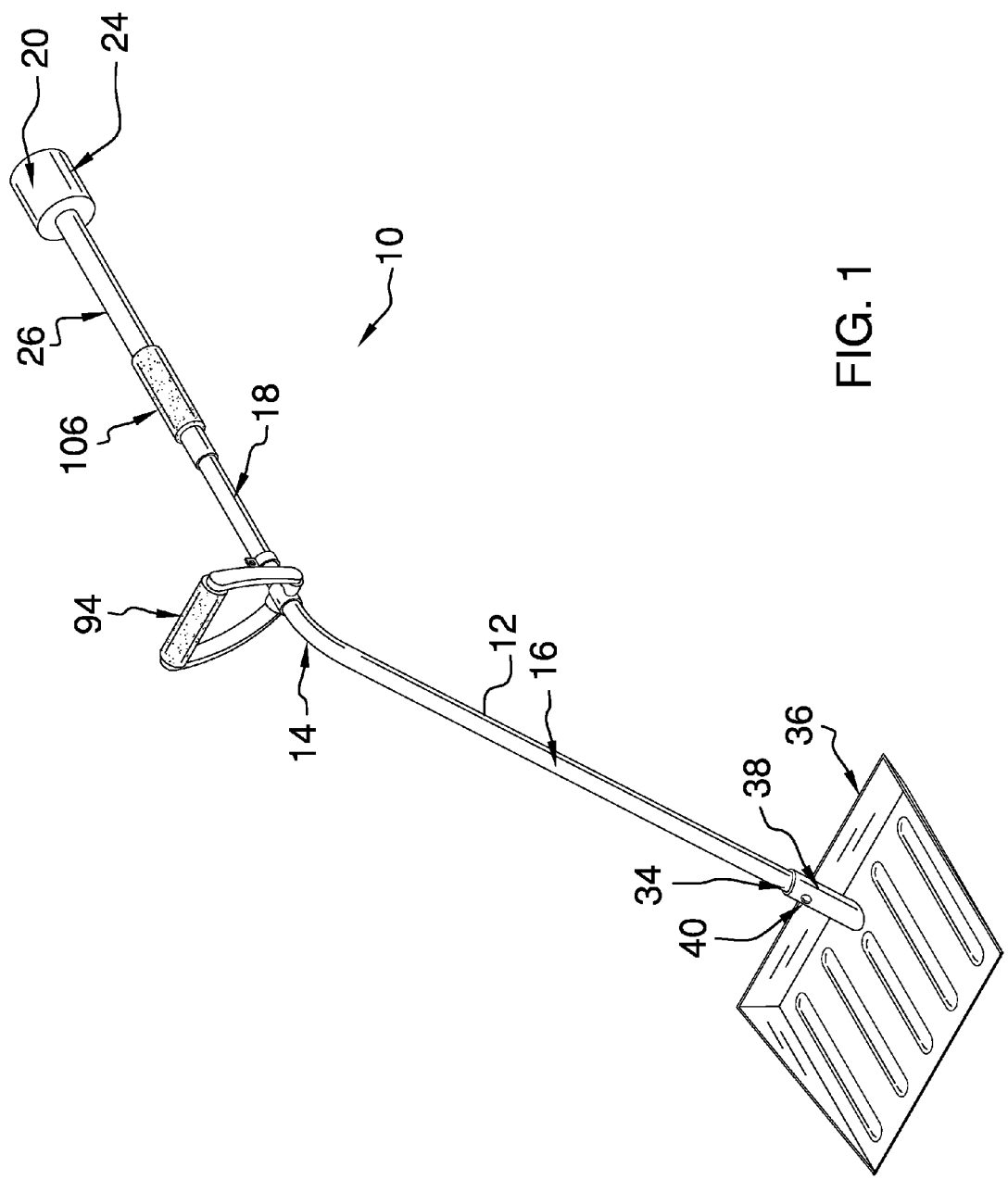
FIG. 1 is an isometric perspective view of an ergonomic counter-balanced handled tool according to an embodiment of the disclosure.
Figure 2:
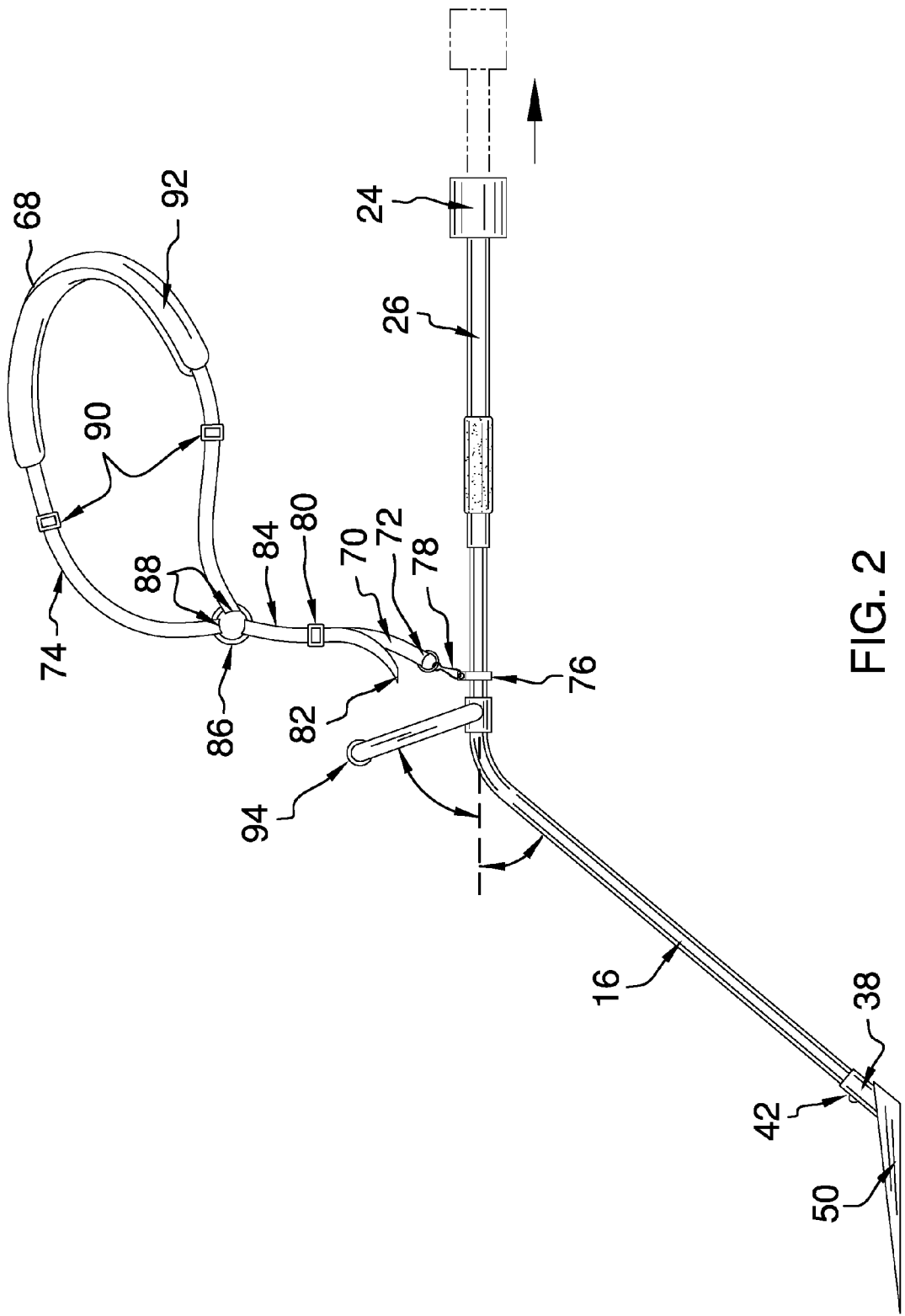
FIG. 2 is a side view of an embodiment of the disclosure.
Figure 3:
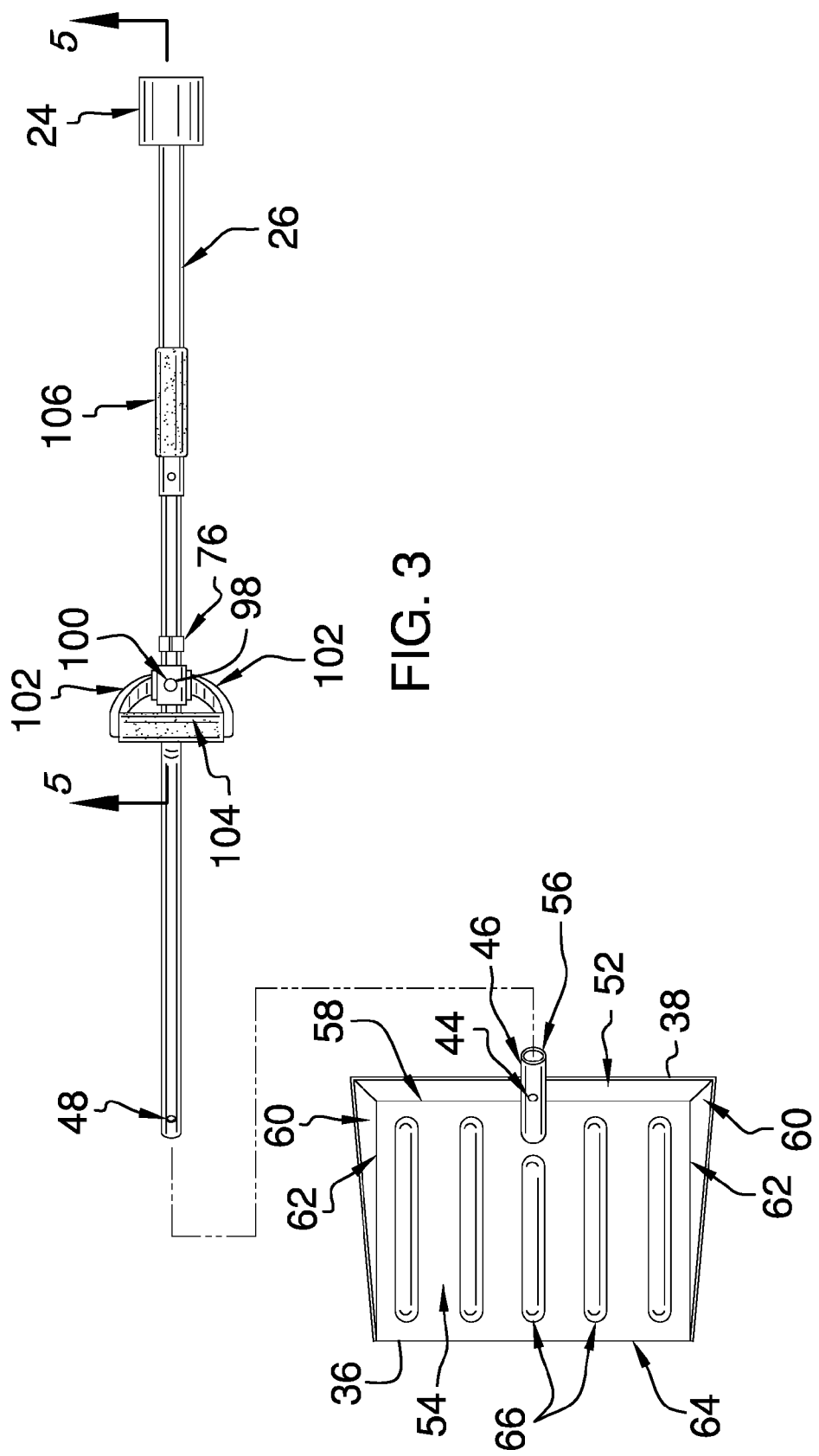
FIG. 3 is a top view of an embodiment of the disclosure.
Figure 4:
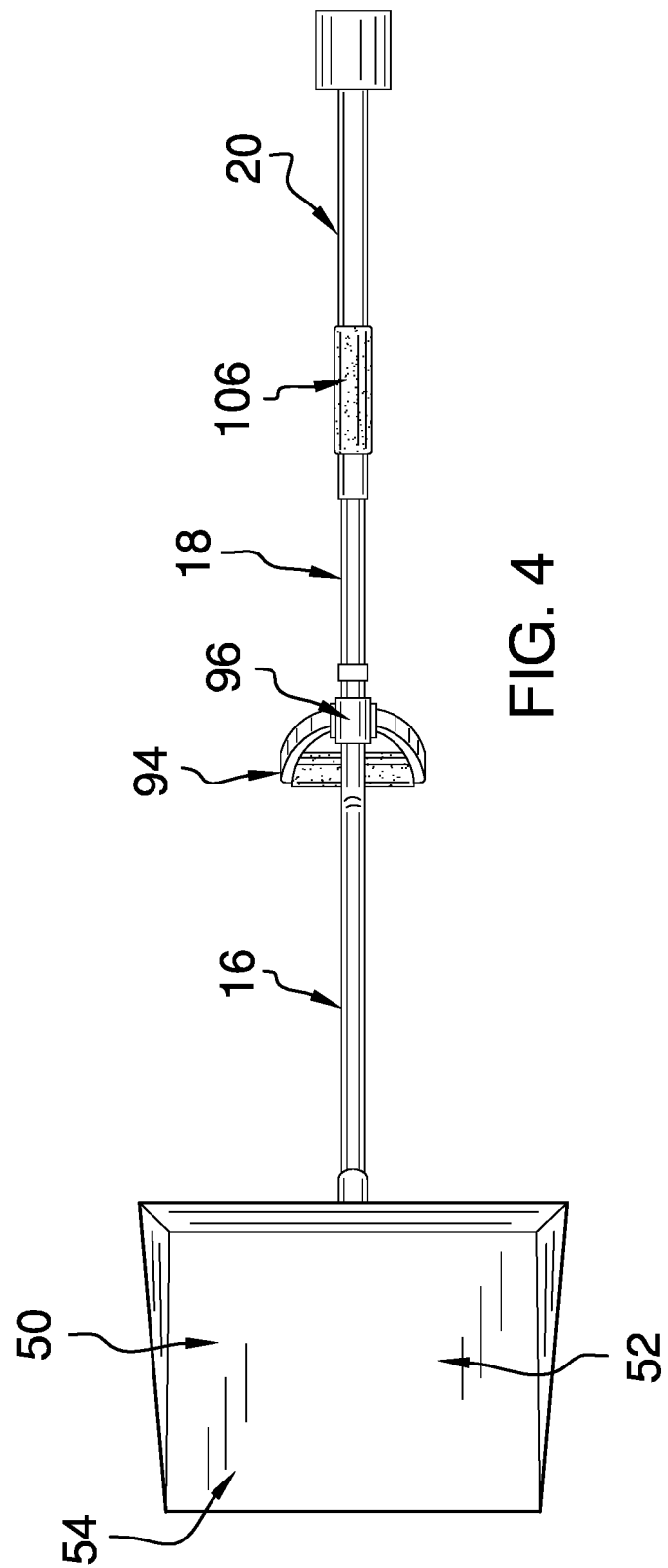
FIG. 4 is a bottom view of an embodiment of the disclosure.
Figure 5:
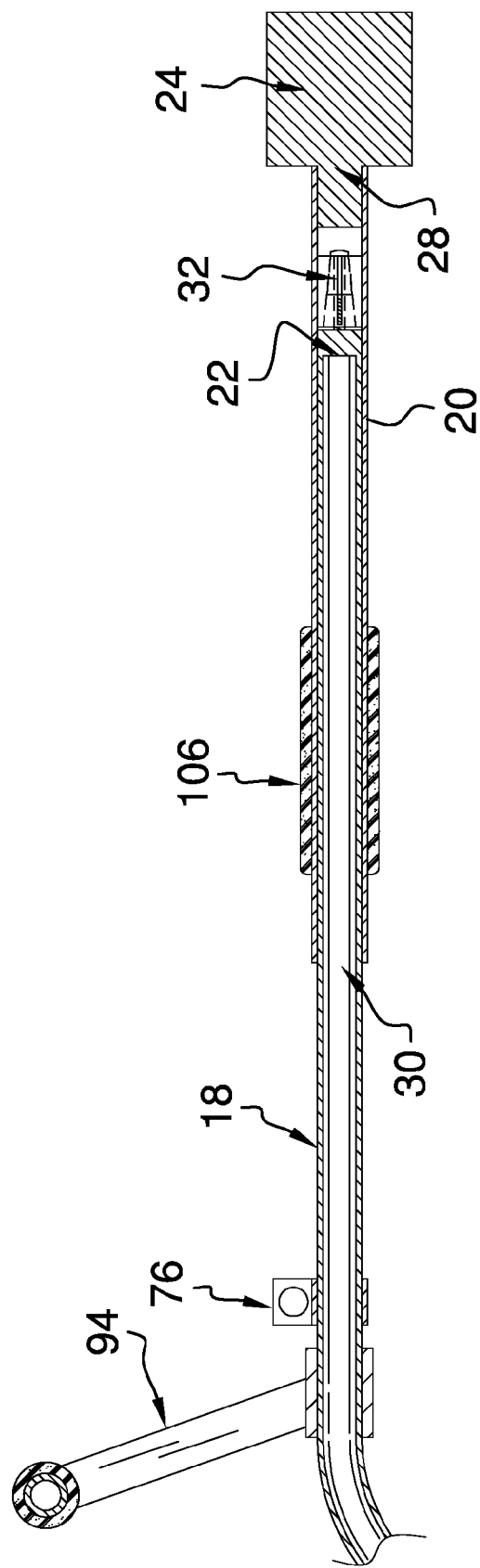
FIG. 5 is a cross-sectional view of an embodiment of the disclosure.

With reference now to the drawings, and in particular to FIGS. 1 through 5 thereof, a new handled tool embodying the principles and concepts of an embodiment of the disclosure and generally designated by the reference numeral 10 will be described.

As best illustrated in FIGS. 1 through 5, the ergonomic counter-balanced handled tool 10 generally comprises a tube 12 that is angled proximate to a midpoint 14 of the tube 12, defining a lower section 16 and an upper section 18 of the tube 12. The lower section 16 extends transversely from the upper section 18. Preferably, the lower section 16 is angled from the upper section 18 from ten to eighty degrees. More preferably, the lower section 16 is angled from the upper section 18 from thirty to fifty degrees. Most preferably, the lower section 16 is angled from the upper section 18 forty five degrees. The tube 12 is circular when viewed longitudinally.

A counterweight 20 is slidably coupled to the upper section 18 proximate to a first end 22 of the tube 12, such that the counterweight 20 is positionable at a user-selected distance from the first end 22. More specifically, the counterweight 20 comprises a weight 24 that is tubular and solid. A cylinder 26, which is hollow, is coupled at a first face 28 to the weight 24. The cylinder 26 is circumferentially larger than the tube 12, such that the tube 12 is slidably positionable through a second face 30 of the cylinder 26. A lock 32, which is coupled to the cylinder 26 proximate to the second face 30, is configured to fix the cylinder 26 in a selected position relative to the tube 12. The lock 32 is engaged when the cylinder 26 is rotated relative to the tube 12. The counterweight 20 is slidably adjustable relative to the tube 12 to balance a respective load positioned at a second end 34 of the tube 12.

A tool 36 is reversibly couplable to the second end 34 of the tube 12. The tool 36 comprises a socket 38 that is complementary to the tube 12, such that the tube 12 is insertable into the socket 38. A first fastener 40 is positioned in the socket 38 and a second fastener 42 is positioned proximate to the second end 34 of the tube 12. The second fastener 42 is complementary to the first fastener 40, such that the first fastener 40 is positioned to reversibly couple with the second fastener 42 to couple the tool 36 to the tube 12. Preferably, the first fastener 40 comprises a hole 44 positioned through a wall 46 of the socket 38 and the second fastener 42 comprises a spring-loaded pin 48.

The tool 36 may comprise a plurality of heads 50. Each of the plurality of heads 50 is reversibly couplable to the second end 34 of the tube 12 and designed to meet a specific task. The present invention anticipates a variety of head 50 types, including pitch fork, spade, flat spade, tile scrapper and weed eater heads 50. Preferably, the tool 36 comprises a snow shovel head 52. The snow shovel head 52 comprises a panel 54 that is substantially rectangularly shaped and rigid. A back 56 is coupled to a rear edge 58 of the panel 54. Each of a pair of sides 60 is coupled to a respective opposing edge 62 of the panel 54 and to the back 56. Each side 60 extends from the back 56 to a front edge 64 of the panel 54. The sides 60 are substantially triangularly shaped, such that the sides 60 vanish proximate to the front edge 64. A plurality of ridges 66 may be positioned in the panel 54. The ridges 66 extend from proximate to the rear edge 58 to proximate to the front edge 64. The socket 38 is coupled to the panel 54 proximate to the rear edge 58 and to the back 56 equally distant from the opposing edges 62 of the panel 54. The socket 38 is angled from the panel 54 such that the panel 54 and the upper section 18 are substantially parallel.

A harness 68 is couplable to the upper section 18 of the tube 12, such that the harness 68 is configured to position around a user's shoulder. The harness 68 comprises a strap 70 coupled at a first terminus 72 to the tube 12 and a shoulder loop 74 adjustably coupled to the strap 70. More specifically, the harness 68 comprises a ring 76 that is coupled to the upper section 18 of the tube 12. A carabiner 78, which is complementary to the ring 76, is coupled to the first terminus 72 of the strap 70. The carabiner 78 is positioned to reversibly couple to the ring 76, such that the harness 68 is attachable to and removable from the tube 12. A first buckle 80 is positioned on the strap 70. The strap 70 has a second terminus 82, which is positioned through the first buckle 80 defining a strap loop 84. A band 86, which is circular, is positioned around the strap 70 within the strap loop 84. The shoulder loop 74 has opposing ends 88, each of which is coupled to the band 86. Each of a pair of second buckles 90 is positioned on the shoulder loop 74 proximate to a respective opposing end 88. The second buckles 90 are configured to adjust the size of the shoulder loop 74. A pad 92 is coupled to the shoulder loop 74 between the pair of second buckles 90.

A handle 94 is slidably coupled to the upper section 18 proximate to the midpoint 14 of the tube 12 and extends transversely from the tube 12. The handle 94 is angled from the upper section 18 from forty five to ninety degrees. Preferably, the handle 94 is angled from the upper section 18 from sixty to seventy five degrees. More specifically, the handle 94 comprises a pipe 96. The pipe 96 is circumferentially larger that the tube 12, such that the tube 12 is positionable through the pipe 96. A penetration 98 is positioned through the pipe 96. The penetration 98 is threaded. A screw 100, which is complementary to the penetration 98, is positioned to be tightened to lock the pipe 96 in a selected position on the tube 12 and loosened to reposition the pipe 96. Each of a pair of side beams 102 extends transversely from the pipe 96. The side beams 102 are arcuate. A center beam 104, which is padded, is coupled to and extends between the pair of side beams 102 distal from the pipe 96. The handle 94 is substantially equilaterally triangularly shaped.

A grip 106, which is pliable, is coupled proximate to the second face 30 of the cylinder 26.

In use, the harness 68 is configured to position around the shoulder of a user to support the tube 12. The handle 94 and the grip 106 are positioned on the upper section 18 of the tube 12 for grasping by the user. The counterweight 20 is positioned to extend from the first end 22 of the tube 12 such that the tool 36 and a respective load positioned at the second end 34 are substantially balanced relative to the harness 68.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An ergonomic counter-balanced handled tool comprising:
    a tube, said tube being angled proximate to a midpoint of said tube defining a lower section and an upper section of said tube, such that said lower section extends transversely from said upper section;
    a counterweight, said counterweight being slidably coupled to said upper section proximate to a first end of said tube, such that said counterweight is positionable at a user-selected distance from said first end;
    a tool, said tool being reversibly couplable to a second end of said tube;
    a harness, said harness being couplable to said upper section of said tube, wherein said harness is configured to position around a user's shoulder;
    wherein said counterweight is positioned to extend from said first end of said tube such that said tool and a respective load positioned at said second end are substantially balanced relative to said harness; and
    said counterweight comprising
       a weight, said weight being tubular, said weight being solid,
       a cylinder, said cylinder being hollow, said cylinder being coupled at a first face to said weight, said cylinder being circumferentially larger that said tube, wherein said tube is slidably positionable through a second face of said cylinder,
       a lock, said lock being coupled to said cylinder proximate to said second face, said lock being configured to fix said cylinder in a selected position relative to said tube, wherein said lock is engaged when said cylinder is rotated relative to said tube, and
       wherein said counterweight is slidably adjustable relative to said tube to balance a respective load positioned at said second end of said tube.

2. The tool of claim 1, further including said lower section being angled from said upper section from ten to eighty degrees.

3. The tool of claim 2, further including said lower section being angled from said upper section from thirty to fifty degrees.

4. The tool of claim 3, further including said lower section being angled from said upper section forty five degrees.

5. The tool of claim 1, further including said tube being circular when viewed longitudinally.

6. The tool of claim 1, further comprising:
    said tool comprising a socket, said socket being complementary to said tube, wherein said tube is insertable into said socket;
    a first fastener, said first fastener being positioned in said socket;
    a second fastener, said second fastener being positioned proximate to said second end of said tube, said second fastener being complementary to said first fastener, wherein said first fastener is positioned to reversibly couple with said second fastener to couple said tool to said tube.

7. The tool of claim 6, further comprising:
    said first fastener comprising a hole positioned through a wall of said socket; and
    said second fastener comprising a spring-loaded pin.

8. The tool of claim 1, further including said tool comprising a plurality of heads, each of said plurality of heads being reversibly couplable to said second end of said tube, wherein each of said plurality of heads is designed for a specific task.

9. The tool of claim 1, further including said tool comprising a snow shovel head.

10. The tool of claim 9, further including said snow shovel head comprising:
a panel, said panel being substantially rectangularly shaped, said panel being rigid;
a back, said back being coupled to a rear edge of said panel;
a pair of sides, each said side being coupled to a respective opposing edge of said panel and to said back, each said side extending from said back to a front edge of said panel, said sides being substantially triangularly shaped, such that said sides vanish proximate to said front edge;
a plurality of ridges, said ridges being positioned in said panel, said ridges extending from proximate to said rear edge to proximate to said front edge; and
said socket being coupled to said panel proximate to said rear edge, said socket being coupled to said back equally distant from said opposing edges of said panel, said socket being angled from said panel such that said panel and said upper section are substantially parallel.

11. The tool of claim 1, further including said harness comprising a strap coupled at a first terminus to said tube and a shoulder loop adjustably coupled to said strap.

12. The tool of claim 11, further including said harness comprising:
a ring, said ring being coupled to said upper section of said tube;
a carabiner, said carabiner being coupled to said first terminus of said strap, said carabiner being complementary to said ring, wherein said ring is positioned to reversibly couple to said carabiner, such that said harness is attachable to and removable from said tube;
a first buckle, said first buckle being positioned on said strap, said strap having a second terminus, said second terminus being positioned through said first buckle defining a strap loop;
a band, said band being circular, said band being positioned around said strap within said strap loop;
said shoulder loop having opposing ends, said opposing ends being coupled to said band;
a pair of second buckles, each said second buckle being positioned on said shoulder loop proximate to a respective said opposing end, wherein said second buckles are configured to adjust the size of said shoulder loop; and
a pad, said pad being coupled to said shoulder loop between said pair of second buckles.

13. The tool of claim 1, further including a handle, said handle being slidably coupled to said upper section proximate to said midpoint of said tube, said handle extending transversely from said tube.

14. The tool of claim 13, further including said handle being angled from said upper section from forty five to ninety degrees.

15. The tool of claim 14, further including said handle being angled from said upper section from sixty to seventy five degrees.

16. The tool of claim 13, further including said handle comprising:
a pipe, said pipe being circumferentially larger that said tube, wherein said tube is positionable through said pipe;
a penetration, said penetration being positioned through said pipe, said penetration being threaded;
a screw, said screw being complementary to said penetration, wherein said screw is positioned to be tightened to lock said pipe in a selected position on said tube and loosened to reposition said pipe;
a pair of side beams, each said beam extending transversely from said pipe, said side beams being arcuate; and
a center beam, said center beam being coupled to and extending between said pair of side beams distal from said pipe, such that said handle is substantially equilaterally triangularly shaped, said center beam being padded.

17. The tool of claim 1, further including a grip, said grip being coupled proximate to said second face of said cylinder.

18. The tool of claim 17, further including said grip being pliable.

19. An ergonomic counter-balanced handled tool comprising:
a tube, said tube being angled proximate to a midpoint of said tube defining a lower section and an upper section of said tube, such that said lower section extends transversely from said upper section, said lower section being angled from said upper section from ten to eighty degrees, said lower section being angled from said upper section from thirty to fifty degrees, said lower section being angled from said upper section forty five degrees, said tube being circular when viewed longitudinally;
a counterweight, said counterweight being slidably coupled to said upper section proximate to a first end of said tube, such that said counterweight is positionable at a user-selected distance from said first end;
said counterweight comprising:
a weight, said weight being tubular, said weight being solid,
a cylinder, said cylinder being hollow, said cylinder being coupled at a first face to said weight, said cylinder being circumferentially larger that said tube, wherein said tube is slidably positionable through a second face of said cylinder,
a lock, said lock being coupled to said cylinder proximate to said second face, said lock being configured to fix said cylinder in a selected position relative to said tube, wherein said lock is engaged when said cylinder is rotated relative to said tube, and
wherein said counterweight is slidably adjustable relative to said tube to balance a respective load positioned at said second end of said tube;
a tool, said tool being reversibly couplable to a second end of said tube;
said tool comprising a socket, said socket being complementary to said tube, wherein said tube is insertable into said socket
a first fastener, said first fastener being positioned in said socket, said first fastener comprising a hole positioned through a wall of said socket;
a second fastener, said second fastener being positioned proximate to said second end of said tube, said second fastener being complementary to said first fastener, wherein said first fastener is positioned to reversibly couple with said second fastener to couple said tool to said tube, said second fastener comprising a spring-loaded pin;
said tool comprising a plurality of heads, each of said plurality of heads being reversibly couplable to said second end of said tube, wherein each of said plurality of heads is designed for a specific task;
said tool comprising a snow shovel head, said snow shovel head comprising:

a panel, said panel being substantially rectangularly shaped, said panel being rigid, a back, said back being coupled to a rear edge of said panel, a pair of sides, each said side being coupled to a respective opposing edge of said panel and to said back, each said side extending from said back to a front edge of said panel, said sides being substantially triangularly shaped, such that said sides vanish proximate to said front edge, a plurality of ridges, said ridges being positioned in said panel, said ridges extending from proximate to said rear edge to proximate to said front edge, and said socket being coupled to said panel proximate to said rear edge, said socket being coupled to said back equally distant from said opposing edges of said panel, said socket being angled from said panel such that said panel and said upper section are substantially parallel;

a harness, said harness being couplable to said upper section of said tube, wherein said harness is configured to position around a user's shoulder, said harness comprising a strap coupled at a first terminus to said tube and a shoulder loop adjustably coupled to said strap;

said harness comprising:

a ring, said ring being coupled to said upper section of said tube, a carabiner, said carabiner being coupled to said first terminus of said strap, said carabiner being complementary to said ring, wherein said ring is positioned to reversibly couple to said carabiner, such that said harness is attachable to and removable from said tube, a first buckle, said first buckle being positioned on said strap, said strap having a second terminus, said second terminus being positioned through said first buckle defining a strap loop, a band, said band being circular, said band being positioned around said strap within said strap loop, said shoulder loop having opposing ends, said opposing ends being coupled to said band, a pair of second buckles, each said second buckle being positioned on said shoulder loop proximate to a respective said opposing end, wherein said second buckles are configured to adjust the size of said shoulder loop, and a pad, said pad being coupled to said shoulder loop between said pair of second buckles;

a handle, said handle being slidably coupled to said upper section proximate to said midpoint of said tube, said handle extending transversely from said tube, said handle being angled from said upper section from forty five to ninety degrees, said handle being angled from said upper section from sixty to seventy five degrees;

said handle comprising:

a pipe, said pipe being circumferentially larger that said tube, wherein said tube is positionable through said pipe;

a penetration, said penetration being positioned through said pipe, said penetration being threaded, a screw, said screw being complementary to said penetration, wherein said screw is positioned to be tightened to lock said pipe in a selected position on said tube and loosened to reposition said pipe, a pair of side beams, each said beam extending transversely from said pipe, said side beams being arcuate, and a center beam, said center beam being coupled to and extending between said pair of side beams distal from said pipe, such that said handle is substantially equilaterally triangularly shaped, said center beam being padded;

a grip, said grip being coupled proximate to said second face of said cylinder, said grip being pliable; and wherein said harness is configured to position around the shoulder of a user to support said tube, wherein said handle and said grip are positioned on said upper section of said tube for grasping by the user, and wherein said counterweight is positioned to extend from said first end of said tube such that said tool and a respective load positioned at said second end are substantially balanced relative to said harness.

\* \* \* \* \*